(12) United States Patent
Weng

(10) Patent No.: US 9,775,098 B2
(45) Date of Patent: Sep. 26, 2017

(54) USER EQUIPMENT TRACING METHOD AND SYSTEM, ACCESS DEVICE, AND ACCESS CONTROLLER

(71) Applicant: Huawei Technologies Co., Ltd., Shenzhen, Guangdong (CN)

(72) Inventor: Zaixin Weng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 14/661,909

(22) Filed: Mar. 18, 2015

(65) Prior Publication Data

US 2015/0195773 A1     Jul. 9, 2015

Related U.S. Application Data

(63) Continuation of application No. PCT/CN2012/081594, filed on Sep. 19, 2012.

(51) Int. Cl.
   *H04W 48/14*     (2009.01)
   *H04W 40/24*     (2009.01)
   *G01S 5/02*      (2010.01)

(52) U.S. Cl.
   CPC .......... *H04W 48/14* (2013.01); *G01S 5/02* (2013.01); *H04W 40/246* (2013.01)

(58) Field of Classification Search
   CPC ..... H04W 40/246; H04W 48/14; H04W 4/00; H04W 48/08; H04L 41/085
   See application file for complete search history.

(56) References Cited

U.S. PATENT DOCUMENTS

| | | | | |
|---|---|---|---|---|
| 7,940,718 B2 * | 5/2011 | Olsson | ............... | H04L 43/0817 370/328 |
| 8,219,081 B2 * | 7/2012 | Kondo | ............... | H04W 48/08 455/412.1 |
| 8,787,901 B2 * | 7/2014 | Racz | ............... | H04W 24/08 455/423 |
| 9,001,739 B2 * | 4/2015 | Tian | ............... | H04W 24/00 370/328 |
| 9,277,047 B2 * | 3/2016 | Racz | ............... | H04W 24/08 |

(Continued)

FOREIGN PATENT DOCUMENTS

| | | |
|---|---|---|
| CN | 101094485 A | 12/2007 |
| CN | 101132648 A | 2/2008 |

(Continued)

*Primary Examiner* — Ahmed Elallam

(57) ABSTRACT

Embodiments of the present invention provide a user equipment tracing method and system, an access device, and an access controller. The method includes: sending, by an access device, a query request message to an access controller, where the query request message includes a user equipment identifier, so that the access controller queries a tracing task list according to the user equipment identifier, determines that the tracing task list includes the user equipment identifier, and sends a query response message to the access device, where the query response message includes a tracing identifier and/or the user equipment identifier; and receiving, by the access device, the query response message sent by the access controller, and if it is determined that the query response message includes the tracing identifier, performing a signaling tracing operation on the user equipment.

15 Claims, 7 Drawing Sheets

An access device sends a query request message to an access controller, where the query request message includes the user equipment identifier, so that the access controller queries a tracing task list according to the user equipment identifier, determines whether the tracing task list includes the user equipment identifier, and sends a query response message to the access device — 101

The access device receives the query response message sent by the access controller, and if it is determined that the query response message includes a tracing identifier and/or the user equipment identifier, performs a signaling tracing operation on the user equipment — 102

(56) References Cited

U.S. PATENT DOCUMENTS

| | | | | |
|---|---|---|---|---|
| 9,525,973 B2* | 12/2016 | Racz | .................... | H04W 24/00 |
| 2010/0272263 A1* | 10/2010 | Yao | ....................... | H04W 8/20 |
| | | | | 380/270 |
| 2011/0222511 A1* | 9/2011 | Weng | .................... | H04L 41/085 |
| | | | | 370/331 |
| 2011/0319115 A1* | 12/2011 | Racz | .................... | H04W 24/10 |
| | | | | 455/514 |
| 2012/0309431 A1* | 12/2012 | Bodog | ................. | H04W 16/18 |
| | | | | 455/456.6 |
| 2012/0315949 A1* | 12/2012 | Zhang | ................. | H04W 24/08 |
| | | | | 455/525 |
| 2013/0100892 A1* | 4/2013 | Tian | .................... | H04W 24/00 |
| | | | | 370/328 |
| 2013/0150008 A1* | 6/2013 | Huang | ................. | H04W 24/00 |
| | | | | 455/414.1 |
| 2013/0254376 A1* | 9/2013 | Kudikala | ............... | H04L 43/10 |
| | | | | 709/224 |

FOREIGN PATENT DOCUMENTS

| | | |
|---|---|---|
| CN | 101547456 A | 9/2009 |
| CN | 101765131 A | 6/2010 |
| CN | 101772001 A | 7/2010 |
| CN | 101790180 A | 7/2010 |
| CN | 102291805 A | 12/2011 |

* cited by examiner

USER EQUIPMENT TRACING METHOD AND SYSTEM, ACCESS DEVICE, AND ACCESS CONTROLLER

CROSS-REFERENCE TO RELATED APPLICATIONS

This application is a continuation of International Application No. PCT/CN2012/081594, filed on Sep. 19, 2012, which is hereby incorporated by reference in its entirety.

TECHNICAL FIELD

The present invention relates to communications technologies, and in particular, to a user equipment tracing method and system, an access device, and an access controller.

BACKGROUND

With the development of a wireless local area network (Wireless Local Area Network, WLAN), a user equipment tracing method is widely used as an important means of fault diagnosis and network optimization.

In the prior art, a tracing task for a user equipment is generally started by presetting a MAC address of the user equipment on an access controller (AC), and signaling that is related to the user equipment and exchanged between the AC and an Access Point (AP), exchanged between the AC and an AAA server (Authentication, Authorization, Accounting, AAA), and exchanged between the AC and a WEB authentication server (Portal) is traced. However, signaling that is related to the user equipment and terminated at an AP cannot be traced by using the AC, and tracing of the signaling that is related to the user equipment and terminated at the AP needs to be triggered by using the AP.

In a practical application, however, a user equipment frequently switches APs, and in order to implement tracing of signaling that is related to the user equipment and terminated at the AP, signaling tracing needs to be preset for the user equipment on each AP one by one. Therefore, an existing user equipment tracing method for tracing user signaling terminated at an AP has a problem of low efficiency.

SUMMARY

Embodiments of the present invention provide a user equipment tracing method and system, an access device, and an access controller, so as to alleviate a problem that an existing user equipment tracing method has low efficiency in tracing user signaling terminated at an AP.

According to a first aspect, an embodiment of the present invention provides a user equipment tracing method, including:

sending, by an access device, a query request message to an access controller, where the query request message includes the user equipment identifier, so that the access controller queries a tracing task list according to the user equipment identifier, determines whether the tracing task list includes the user equipment identifier, and sends a query response message to the access device; and receiving, by the access device, the query response message sent by the access controller, and if it is determined that the query response message includes a tracing identifier and/or the user equipment identifier, performing a signaling tracing operation on the user equipment; where the user equipment is a user equipment to which the user equipment identifier points.

In a first possible implementation manner, before the sending, by an access device, a query request message to an access controller, the method includes:

receiving, by the access device, an access request sent by the user equipment, and buffering signaling related to the user equipment; and after the receiving, by the access device, the query response message sent by the access controller, the method includes:

if it is determined that the query response message does not include the tracing identifier, deleting the buffered signaling related to the user equipment and stopping buffering signaling of the user equipment.

Based on the first possible implementation manner, in a second possible implementation manner, the receiving, by the access device, the query response message sent by the access controller includes:

if the access device does not receive, within a preset timeout period, the query response message sent by the access controller, deleting buffered signaling related to the user equipment and stopping buffering signaling of the user equipment.

The query request message includes but is not limited to at least one of: an association request message, or an authentication request message, or a handover request message;

the user equipment identifier includes but is not limited to at least one of: a media access control MAC address, or an international mobile subscriber identity IMSI, or an Internet card number, or an international mobile equipment identity IMEI, or an international mobile equipment identity MSISDN of the user equipment; and the query response message includes but is not limited to at least one of: an association answer message, or an authentication answer message, or a tracing starting message, or a handover notification message.

Based on the first possible implementation manner, in a third possible implementation manner, the performing a signaling tracing operation on the user equipment includes:

sending, by the access device, signaling related to the user equipment to the access controller, or sending the signaling related to the user equipment to a specified server.

Based on the first and the third possible implementation manners, in a fourth possible implementation manner, the method further includes:

receiving, by the access device, a tracing stop message sent by the access controller, where the tracing stop message includes the user equipment identifier; and stopping performing the signaling tracing operation on the user equipment includes: sending the signaling related to the user equipment to the access controller, or stopping sending the signaling related to the user equipment to a specified server.

According to a second aspect, an embodiment of the present invention provides a user equipment tracing method, including:

receiving, by an access controller, a query request message sent by an access device, where the query request message includes a user equipment identifier;

querying a tracing task list according to the user equipment identifier; and determining that the tracing task list includes the user equipment identifier, and sending a query response message to the access device, where the query response message includes a tracing identifier and/or the user equipment identifier, so that the access device performs a signaling tracing operation on the user equipment according to the tracing identifier and/or the user equipment identifier; where the user equipment is a user equipment to which the user equipment identifier points.

The query request message includes but is not limited to at least one of: an association request message, or an authentication request message, or a handover request message;

the user equipment identifier includes but is not limited to at least one of: a media access control MAC address, or an international mobile subscriber identity IMSI, or an Internet card number, or an international mobile equipment identity IMEI, or an international mobile equipment identity MSISDN of the user equipment; and the query response message includes but is not limited to at least one of: an association answer message, or an authentication answer message, or a tracing starting message, or a handover notification message.

In a first possible implementation manner, the method further includes:

detecting, by the access controller, a tracing stop event related to the user equipment; and sending, by the access controller, a tracing stop message to the access device, where the tracing stop message includes the user equipment identifier, so that the access device stops sending signaling related to the user equipment to the access controller, or stops sending the signaling related to the user equipment to a specified server.

According to a third aspect, an embodiment of the present invention provides an access device, and the access device includes:

a transceiver module, configured to send a query request message to an access controller, where the query request message includes the user equipment identifier, so that the access controller queries a tracing task list according to the user equipment identifier, determines whether the tracing task list includes the user equipment identifier, and sends a query response message to the access device; and a tracing module, configured to, on a basis in which the transceiver module receives a query response message sent by the access controller, perform a signaling tracing operation on the user equipment if it is determined that the query response message includes a tracing identifier and/or the user equipment identifier; where the user equipment is a user equipment to which the user equipment identifier points.

In a first possible implementation manner, the access device further includes:

a buffering module, configured to, on a basis in which the transceiver module receives an access request sent by the user equipment, buffer signaling related to the user equipment; and a deleting module, configured to, on the basis in which the transceiver module receives a query response message sent by the access controller, delete the buffered signaling related to the user equipment and stop buffering signaling of the user equipment, if it is determined that the query response message does not include the tracing identifier.

Based on the first possible implementation manner, in a second possible implementation manner, the buffering module is specifically configured to, on a basis in which the transceiver module does not receive, within a preset timeout period, the query response message sent by the access controller, delete the buffered signaling related to the user equipment and stop buffering the signaling of the user equipment.

The query request message includes but is not limited to at least one of: an association request message, or an authentication request message, or a handover request message;

the user equipment identifier includes but is not limited to at least one of: a media access control MAC address, or an international mobile subscriber identity IMSI, or an Internet card number, or an international mobile equipment identity IMEI, or an international mobile equipment identity MSISDN of the user equipment; and the query response message includes but is not limited to at least one of: an association answer message, or an authentication answer message, or a tracing starting message, or a handover notification message.

Based on the first possible implementation manner, in a third possible implementation manner, the tracing module is specifically configured to send the signaling related to the user equipment to the access controller, or send the signaling related to the user equipment to a specified server.

Based on the first and the third possible implementation manners, in a fourth possible implementation manner, the access device further includes:

a tracing stop module, configured to, on a basis in which the transceiver module receives a tracing stop message sent by the access controller, where the tracing stop message includes the user equipment identifier, stop performing the signaling tracing operation on the user equipment; and specifically configured to send the signaling related to the user equipment to the access controller, or stop sending the signaling related to the user equipment to a specified server.

According to a fourth aspect, an embodiment of the present invention provides an access controller, including:

a transceiver module, configured to receive a query request message sent by an access device, where the query request message includes a user equipment identifier;

a querying module, configured to, on a basis of the query request message received by the transceiver module, query a tracing task list according to the user equipment identifier; and a determining module, configured to, on a basis in which the querying module queries a tracing task list, determine that the tracing task list includes the user equipment identifier, and send a query response message to the access device by using the transceiver module, where the query response message includes a tracing identifier and/or the user equipment identifier, so that the access device performs a signaling tracing operation on the user equipment according to the tracing identifier and/or the user equipment identifier; where the user equipment is a user equipment to which the user equipment identifier points.

The query request message includes but is not limited to at least one of: an association request message, or an authentication request message, or a handover request message;

the user equipment identifier includes but is not limited to at least one of: a media access control MAC address, or an international mobile subscriber identity IMSI, or an Internet card number, or an international mobile equipment identity IMEI, or an international mobile equipment identity MSISDN of the user equipment; and the query response message includes but is not limited to at least one of: an association answer message, or an authentication answer message, or a tracing starting message, or a handover notification message.

In a first possible implementation manner, the access controller further includes:

a detecting module, configured to detect a tracing stop event related to the user equipment; where the transceiver module is configured to, on a basis in which the detecting module detects a tracing stop event related to the user equipment, send a tracing stop message to the access device, where the tracing stop message includes the user equipment identifier, so that the access device stops sending signaling related to the user equipment to the access controller, or stops sending the signaling related to the user equipment to a specified server.

According to a fifth aspect, an embodiment of the present invention provides a user equipment tracing system, including the foregoing access device and the foregoing access controller.

According to a sixth aspect, an embodiment of the present invention provides an access device, including a processor; and when the processor runs, the following steps are performed:

sending, by the processor, a query request message to an access controller, where the query request message includes the user equipment identifier, so that the access controller queries a tracing task list according to the user equipment identifier, determines whether the tracing task list includes the user equipment identifier, and sends a query response message to the access device; and receiving the query response message sent by the access controller, and if it is determined that the query response message includes a tracing identifier and/or the user equipment identifier, performing a signaling tracing operation on the user equipment; where the user equipment is a user equipment to which the user equipment identifier points.

In a first possible implementation manner, before the sending, by the processor, a query request message to an access controller, the following is included:

receiving an access request sent by the user equipment, and buffering signaling related to the user equipment; and after the receiving the query response message sent by the access controller, the following is included:

if it is determined that the query response message does not include the tracing identifier, deleting the buffered signaling related to the user equipment and stopping buffering signaling of the user equipment.

In a second possible implementation manner, receiving, by the processor, the query response message sent by the access controller includes:

if the query response message sent by the access controller is not received within a preset timeout period, deleting the buffered signaling related to the user equipment and stopping buffering signaling of the user equipment.

The query request message includes but is not limited to at least one of: an association request message, or an authentication request message, or a handover request message;

the user equipment identifier includes but is not limited to at least one of: a MAC address, or an IMSI, or an Internet card number, or an IMEI, or an MSISDN of the user equipment; and the query response message includes but is not limited to at least one of: an association answer message, or an authentication answer message, or a tracing starting message, or a handover notification message.

In a third possible implementation manner, performing, by the processor, a signaling tracing operation on the user equipment includes:

sending signaling related to the user equipment to the access controller, or sending the signaling related to the user equipment to a specified server.

Based on the first, the second, and the third possible implementation manners, in a fourth possible implementation manner, the following is further included:

receiving, by the processor, a tracing stop message sent by the access controller, where the tracing stop message includes the user equipment identifier; and stopping performing the signaling tracing operation on the user equipment includes: sending the signaling related to the user equipment to the access controller, or stopping sending the signaling related to the user equipment to a specified server.

According to a seventh aspect, an embodiment of the present invention provides an access controller, including a processor; and when the processor runs, the following steps are performed:

receiving, by the processor, a query request message sent by an access device, where the query request message includes a user equipment identifier;

querying a tracing task list according to the user equipment identifier; and determining that the tracing task list includes the user equipment identifier, and sending a query response message to the access device, where the query response message includes a tracing identifier and/or the user equipment identifier, so that the access device performs a signaling tracing operation on the user equipment according to the tracing identifier and/or the user equipment identifier; where the user equipment is a user equipment to which the user equipment identifier points.

The query request message includes but is not limited to at least one of: an association request message, or an authentication request message, or a handover request message;

the user equipment identifier includes but is not limited to at least one of: a MAC address, or an IMSI, or an Internet card number, or an IMEI, or an MSISDN of the user equipment; and the query response message includes but is not limited to at least one of: an association answer message, or an authentication answer message, or a tracing starting message (for example, Trace Start), or a handover notification message (for example, an Add new station message).

In a first possible implementation manner, the following is further included:

detecting, by the processor, a tracing stop event related to the user equipment; and sending a tracing stop message to the access device, where the tracing stop message includes the user equipment identifier, so that the access device stops sending signaling related to the user equipment to the access controller, or stops sending the signaling related to the user equipment to a specified server.

It may be learned from the foregoing technical solutions that, in embodiments of the present invention, an access device sends a query request message that includes a user equipment identifier to an access controller, so that the access controller queries a tracing task list, and determines whether to perform signaling tracing on the user equipment; and if it is determined that tracing is needed, a query response message that includes a tracing identifier is returned to the access device, and the access device performs a signaling tracing operation on the user equipment according to the tracing identifier or the user equipment identifier. In this way, signaling tracing for a specified user equipment only needs to be initiated on the access controller, and then tracing of all signaling related to the user equipment may be implemented, where the signaling includes signaling that is terminated at the access device and exchanged between the access controller and peripheral network elements. Even if a user equipment frequently switches between APs, there is no need to preset signaling tracing for the user equipment on each AP one by one, which increases efficiency in signaling tracing. Therefore, a problem that an existing user equipment tracing method has low efficiency in tracing user signaling terminated at an AP may be alleviated.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various wireless communications systems, such as: a Global System for Mobile Communications (GSM, Global System for Mobile Communications) system, a general packet radio service (GPRS, General Packet Radio Service) system, a Code Division Multiple Access (CDMA, Code Division Multiple Access) system, a CDMA2000 system, a Wideband Code Division Multiple Access (WCDMA, Wideband Code Division Multiple Access) system, a Long Term Evolution (LTE, Long Term Evolution) system, a World Interoperability for Microwave Access (World Interoperability for Microwave Access, WiMAX) system, and the like.

It should be noted that, the following described signaling related to a user equipment includes all signaling that is related to the user equipment, terminated at an AP, and exchanged between an AC and peripheral network elements.

Figure 1:
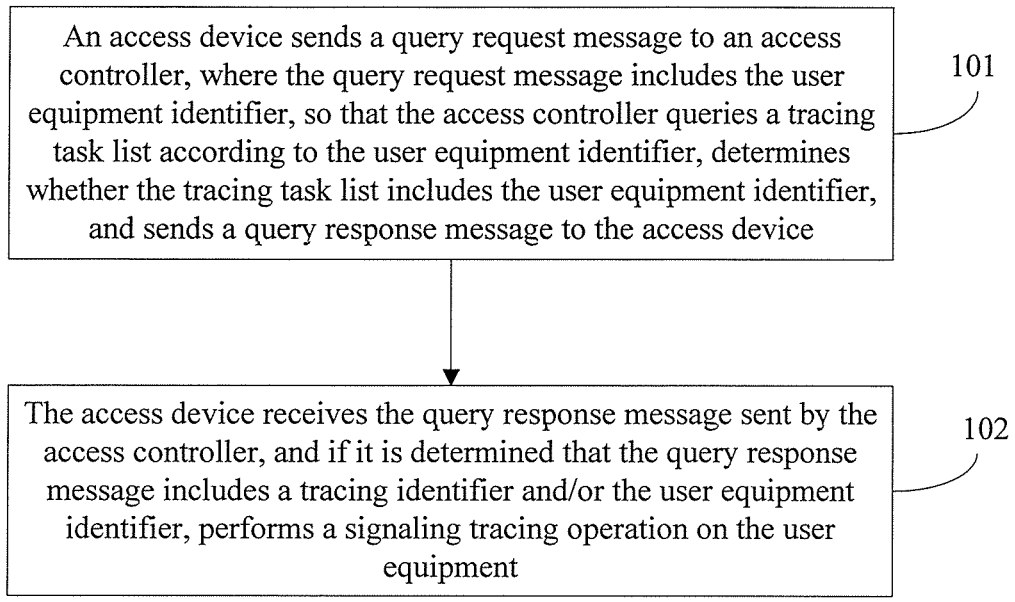
FIG. 1 is a schematic flowchart of a user equipment tracing method according to an embodiment of the present invention.

FIG. 1 is a schematic flowchart of a user equipment tracing method according to an embodiment of the present invention. As shown in FIG. 1, the user equipment tracing method in this embodiment may include the following steps:

101. An access device sends a query request message to an access controller, where the query request message includes a user equipment identifier, so that the access controller queries a tracing task list according to the user equipment identifier, determines whether the tracing task list includes the user equipment identifier, and sends a query response message to the access device.

In an optional implementation manner of the present invention, when the access device receives an access request sent by a user equipment and is uncertain about whether signaling tracing needs to be performed on the user equipment, the access device may buffer signaling related to the user equipment and send a query request message to the access controller, where the query request message includes the user equipment identifier, so that the access controller queries a tracing task list according to the user equipment identifier, determines whether the tracing task list includes the user equipment identifier, and sends a query response message to the access device.

It should be noted that, the foregoing query request message includes but is not limited to at least one of: an association request message, or an authentication request message, or a handover request message.

It should be noted that, the foregoing user equipment identifier includes but is not limited to at least one of: a media access control (Media Access Control, MAC) address, or an International Mobile Subscriber Identification (IMSI), or an Internet card number, or an international mobile equipment identity (International Mobile Equipment Identity, IMEI), or a mobile station international ISDN number (Mobile Station international ISDN number, MSISDN) of the user equipment.

102. The access device receives the query response message sent by the access controller, and if it is determined that the query response message includes a tracing identifier and/or the user equipment identifier, performs a signaling tracing operation on the user equipment.

In an optional implementation manner of the present invention, performing, by the access device, a signaling tracing operation on the user equipment includes: sending, by the access device, signaling related to the user equipment to the access controller, or sending the signaling related to the user equipment to a specified server.

In an optional implementation manner of the present invention, after receiving the query response message sent by the access controller, the access device deletes the buffered signaling related to the user equipment and stops buffering signaling of the user equipment, if it is determined that the query response message does not include the tracing identifier.

In an optional implementation manner of the present invention, if the access device does not receive, within a preset timeout period, the query response message sent by the access controller, the access device deletes the buffered signaling related to the user equipment and stops buffering signaling of the user equipment.

In an optional implementation manner of the present invention, the access device may receive a tracing stop message sent by the access controller, where the tracing stop message includes the user equipment identifier, and stop sending signaling related to the user equipment to the access controller, or stop sending the signaling related to the user equipment to a specified server.

In should be noted that, the foregoing query response message includes but is not limited to at least one of: an association answer message, or an authentication answer message, or a tracing starting message (for example, Trace Start), or a handover notification message (for example, Add new station).

It should be noted that, the foregoing user equipment is a user equipment to which the user equipment identifier points.

In this embodiment of the present invention, an access device sends a query request message that includes a user equipment identifier to an access controller, so that the access controller queries a tracing task list, and determines whether to perform signaling tracing on the user equipment; and if it is determined that tracing is needed, a query response message that includes a tracing identifier is returned to the access device, and the access device performs a signaling tracing operation on the user equipment according to the tracing identifier or the user equipment identifier. In this way, signaling tracing for a specified user equipment only needs to be initiated on the access controller, and then tracing of all signaling related to the user equipment may be implemented, where the signaling includes signaling that is terminated at the access device and exchanged between the access controller and peripheral network elements. Even if a user equipment frequently switches between APs, there is no need to preset signaling tracing for the user equipment on each AP one by one, which improves efficiency in signaling tracing. Therefore, a problem that an existing user equipment tracing method has low efficiency in tracing user signaling terminated at an AP may be alleviated.

Figure 2:
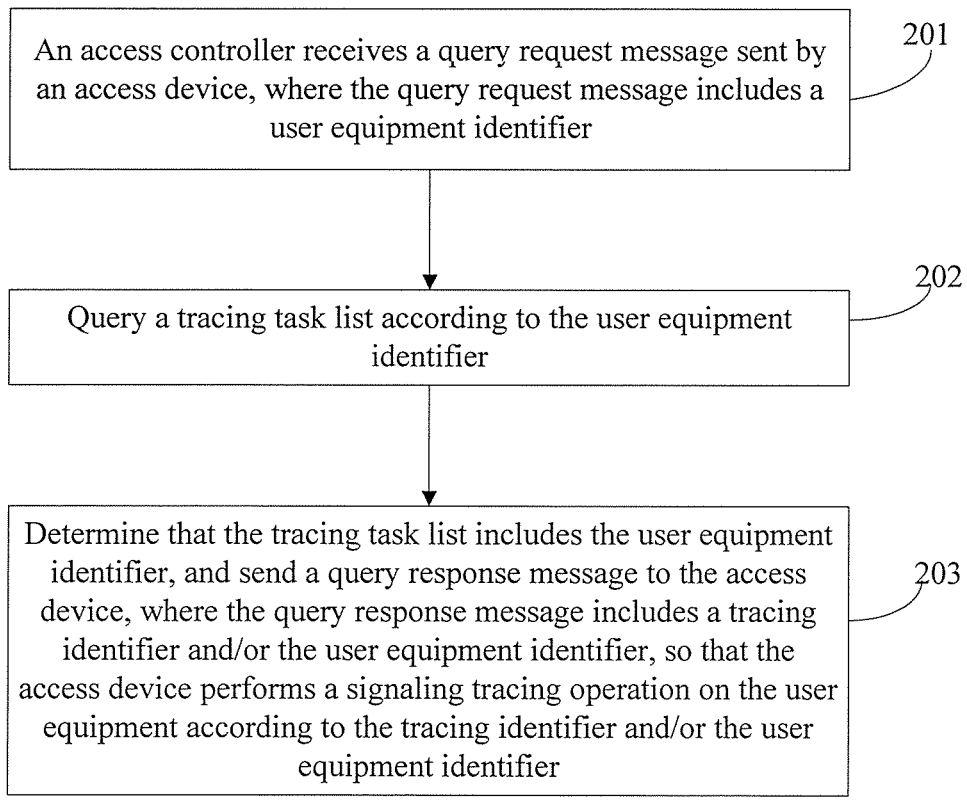
FIG. 2 is a schematic flowchart of a user equipment tracing method according to another embodiment of the present invention.

FIG. 2 is a schematic flowchart of a user equipment tracing method according to another embodiment of the present invention. As shown in FIG. 2, the method includes the following steps:

201. An access controller receives a query request message sent by an access device, where the query request message includes a user equipment identifier.

In this embodiment, when the access device receives an access request sent by a user equipment and is uncertain about whether signaling tracing needs to be performed on the user equipment, the access device may buffer signaling related to the user equipment and send a query request message to the access controller, where the query request message includes the user equipment identifier.

It should be noted that, the foregoing query request message includes but is not limited to at least one of: an association request message, or an authentication request message, or a handover request message.

It should be noted that, the foregoing user equipment identifier includes but is not limited to at least one of: a MAC address, or an IMSI, or an Internet card number, or an IMEI, or an MSISDN of the user equipment.

202. Query a tracing task list according to the user equipment identifier.

In an optional implementation manner of the present invention, the access controller may preset a tracing task list according to a user instruction, and Table 1 is a tracing task list applied in this embodiment.

TABLE 1

| Identifier of user equipment 1 | Tracing start time | Tracing stop time |
|---|---|---|
| Identifier of user equipment 2 | Tracing start time | Tracing stop time |
| ... | | |
| Identifier of user equipment n | Tracing start time | Tracing stop time |

As shown in Table 1, according to a user instruction, the access controller may add an identifier of a user equipment on which signaling tracing needs to be performed into Table 1, and may preset a time during which signaling tracing is performed on the user equipment.

203. Determine that the tracing task list includes the user equipment identifier, and send a query response message to the access device, where the query response message includes a tracing identifier and/or the user equipment identifier, so that the access device performs a signaling tracing operation on the user equipment according to the tracing identifier and/or the user equipment identifier.

It should be noted that, the foregoing user equipment is a user equipment to which the user equipment identifier points.

In should be noted that, the foregoing query response message includes but is not limited to at least one of: an association answer message, or an authentication answer message, or a tracing starting message (for example, Trace Start), or a handover notification message (for example, Add new station).

In an optional implementation manner of the present invention, the access controller may detect a tracing stop event related to the user equipment; for example, it is determined that current system time is preset tracing stop time, and for another example, the user equipment identifier is deleted from the tracing task list according to a user instruction. The access controller may send a tracing stop message to the access device, where the tracing stop message includes the user equipment identifier, so that the access device stops sending signaling related to the user equipment to the access controller, or stops sending the signaling related to the user equipment to a specified server.

In this embodiment of the present invention, an access controller receives a query request message that includes a user equipment identifier and is sent by an access device, queries a tracing task list, and determines whether to perform signaling tracing on the user equipment; and if it is determined that tracing is needed, a query response message that includes a tracing identifier is returned to the access device, so that the access device performs a signaling tracing operation on the user equipment according to the tracing identifier and/or the user equipment identifier. In this way, signaling tracing for a specified user equipment only needs to be initiated on the access controller, and then tracing of all signaling related to the user equipment may be implemented, where the signaling includes signaling that is terminated at the access device and exchanged between the access controller and peripheral network elements. Even if a user equipment frequently switches between APs, there is no need to preset signaling tracing for the user equipment on each AP one by one, which improves efficiency in signaling tracing. Therefore, a problem that an existing user equipment tracing method has low efficiency in tracing user signaling terminated at an AP may be alleviated.

Figure 3:
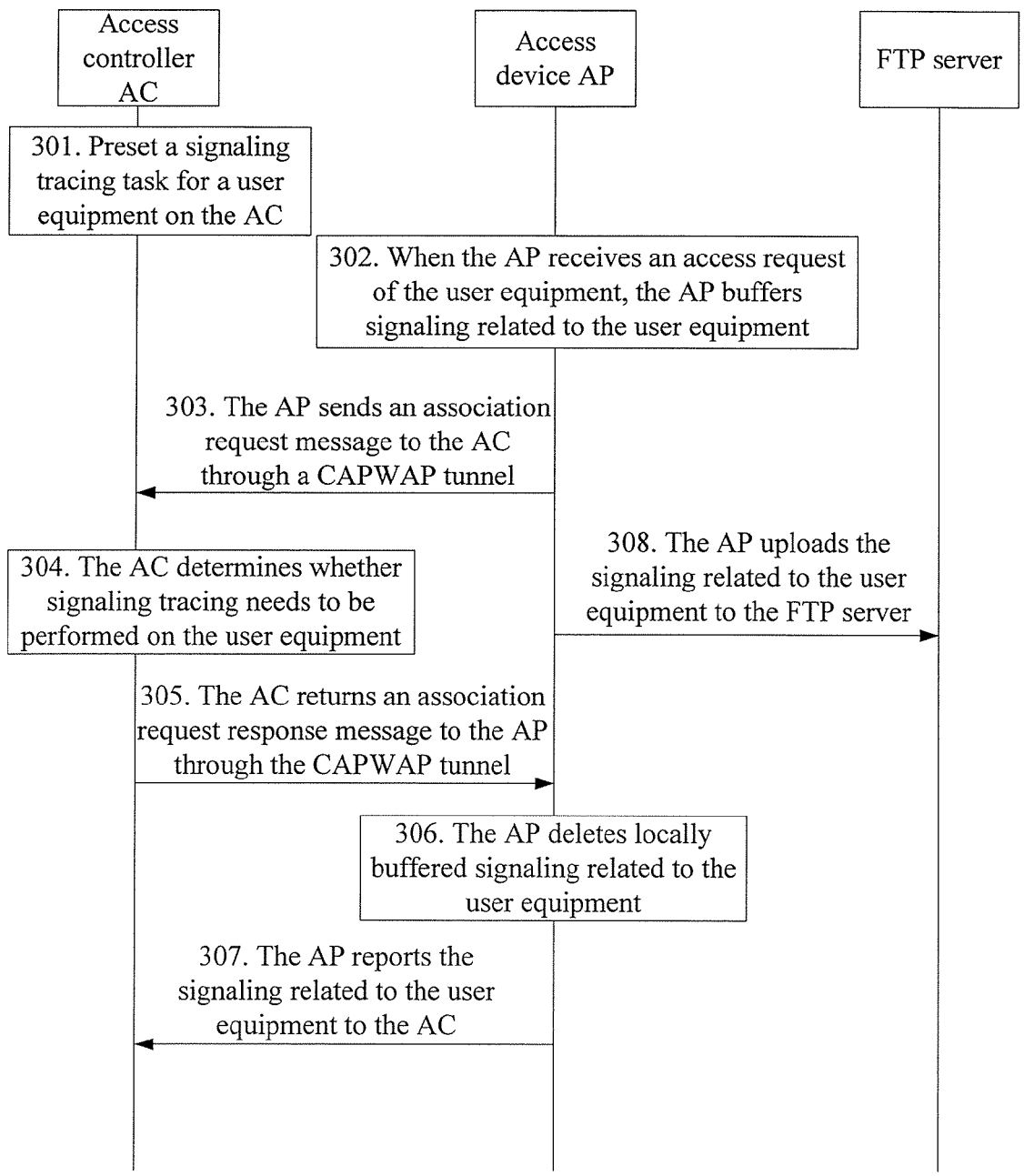
FIG. 3 is a signaling diagram of a user equipment tracing method according to another embodiment of the present invention.

FIG. 3 is a signaling diagram of a user equipment tracing method according to another embodiment of the present invention. In a process in which a user equipment accesses a WLAN network, an AC triggers, by using signaling on a Control And Provisioning of Wireless Access Points Protocol Specification (Control And Provisioning of Wireless Access Points Protocol Specification, CAPWAP) tunnel, tracing of signaling of the user equipment terminated at an AP, and this embodiment may be applicable to a user equipment that uses a MAC address for authentication. As shown in FIG. 3, the method includes the following steps:

301. Preset a signaling tracing task for the user equipment on the AC.

In specific implementation, according to a user instruction, the AC adds an identifier of a user equipment on which signaling tracing needs to be performed into a preset tracing task list, and further, may further preset start time and stop time of signaling tracing performed on the user equipment.

302. When the AP receives an access request of the user equipment, the AP buffers signaling related to the user equipment.

When the AP receives the access request of the user equipment, if the AP is not clear about whether signaling tracing needs to be performed on the user equipment, the AP may first buffer the signaling related to the user equipment.

303. The AP sends an association request message to the AC through the CAPWAP tunnel.

The association request message includes a user equipment identifier, where the user equipment identifier includes but is not limited to at least one of: a MAC address, or an IMSI, or an Internet card number, or an IMEI, or an MSISDN of the user equipment. The association request message is used to instruct the AC to determine whether signaling tracing needs to be performed on the user equipment.

304. The AC determines whether signaling tracing needs to be performed on the user equipment.

In specific implementation, after receiving the association request message, the AC parses the user equipment identifier carried in the association request message, queries the tracing task list, and determines whether signaling tracing needs to be performed on the user equipment.

305. The AC returns an association request response message to the AP through the CAPWAP tunnel.

In specific implementation, if the AC determines that signaling tracing does not need to be performed on the user equipment, the association request response message does not carry a tracing identifier or the tracing identifier is no tracing; and if the AC determines that signaling tracing needs to be performed on the user equipment, the association request response message carries the tracing identifier or the tracing identifier is tracing.

It should be noted that, the AC may use newly-added signaling, for example, Trace Start signaling, to notify the AP that signaling tracing needs to be performed on the user equipment, where the Trace Start signaling includes the user equipment identifier.

306. The AP deletes locally buffered signaling related to the user equipment.

After the AP receives the association request response message or the Trace Start signaling, if it is determined that the association request response message does not carry the tracing identifier or the tracing identifier is no tracing, the AP deletes the locally buffered signaling related to the user equipment.

It should be noted that, in order to relieve local buffer pressure of the AP, when the AP does not receive the association request response message or the Trace Start signaling with in a preset timeout period, the AP may also delete the locally buffered signaling related to the user equipment and stop buffering the signaling related to the user equipment.

307. The AP reports the signaling related to the user equipment to the AC.

In specific implementation, after the AP receives the association request response message or the Trace Start signaling, if it is determined that the association request response message carries the tracing identifier or the tracing identifier is tracing, the AP may send, by using a newly-added tracing result reporting message in the CAPWAP tunnel, the locally buffered and subsequently generated signaling related to the user equipment to the AC.

308. The AP uploads the signaling related to the user equipment to an FTP server.

In an optional implementation manner of the present invention, after the AP receives the association request response message or the Trace Start signaling, if it is determined that the association request response message carries the tracing identifier or the tracing identifier is tracing, the AP saves the locally buffered and subsequently generated signaling related to the user equipment as a format file, for example, a PCAP format, and uploads the format file to a specified server, for example, an FTP server.

It should be noted that, if the association request response message received by the AP does not carry the tracing identifier, but the AP receives, within the preset timeout period, the Trace Start signaling delivered by the AC through the CAPWAP tunnel, the AP may report, by using the newly-added tracing result reporting message in the CAPWAP tunnel, the locally buffered and subsequently generated signaling related to the user equipment to the AC, or save the locally buffered and subsequently generated signaling related to the user equipment as a format file, for example, a PCAP format, and directly upload the format file to a specified FTP server.

In this embodiment of the present invention, an AC receives an association request message that includes a user equipment identifier and is sent by an AP, queries a preset tracing task list, and determines whether to perform signaling tracing on the user equipment; and if it is determined that tracing is needed, an association request response message that includes a tracing identifier or Trace Start signaling that includes the user equipment identifier is returned to the AP, so that the AP performs a signaling tracing operation on the user equipment. In this way, signaling tracing for a specified user equipment only needs to be initiated on the AC, and then tracing of all signaling related to the user equipment may be implemented, where the signaling includes signaling that is terminated at the AP and exchanged between the access controller and peripheral network elements, which improves efficiency in signaling tracing.

Figure 4:
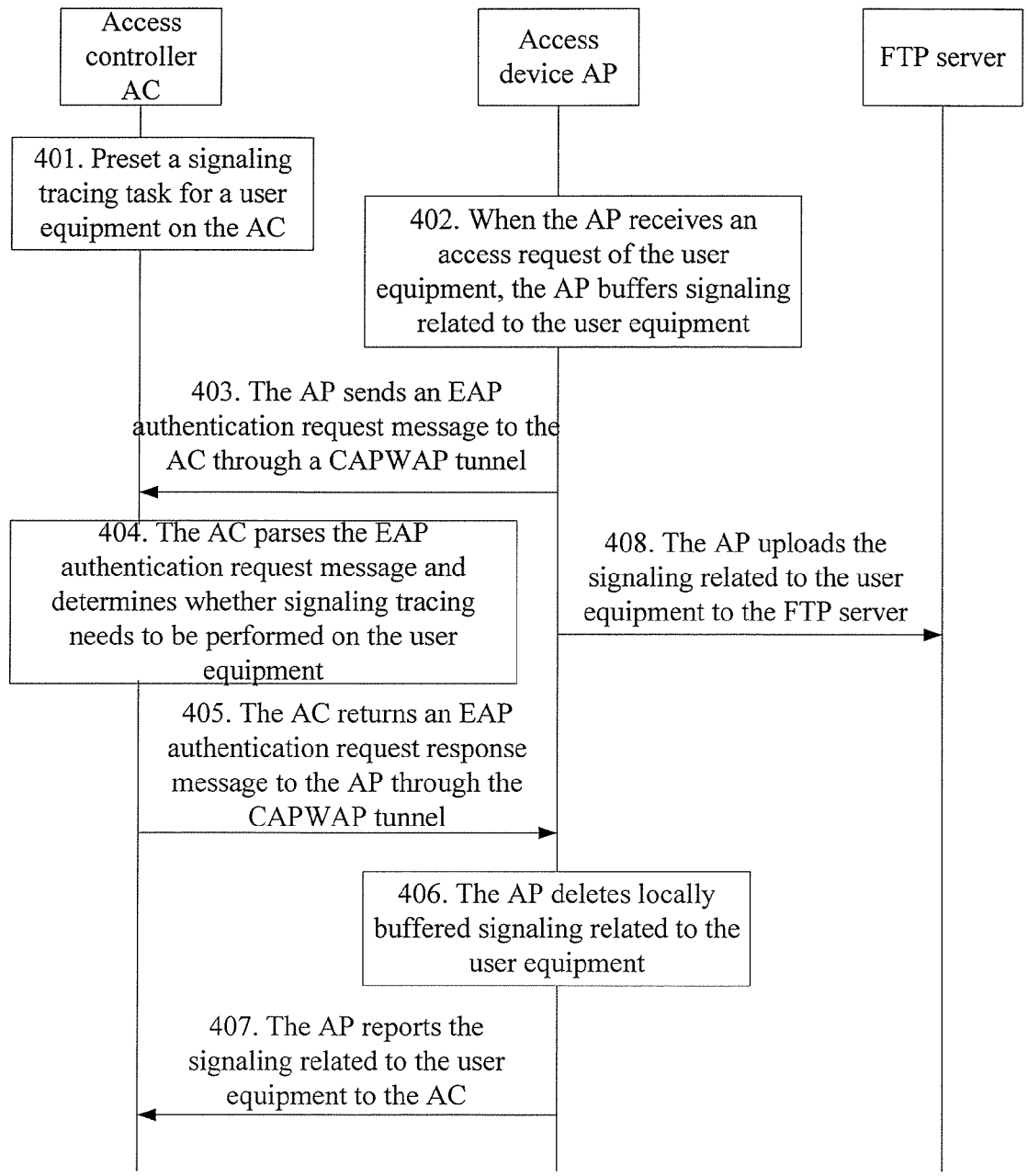
FIG. 4 is a signaling diagram of a user equipment tracing method according to another embodiment of the present invention.

FIG. 4 is a signaling diagram of a user equipment tracing method according to another embodiment of the present invention. In a process in which a user equipment accesses a WLAN network, an AC triggers, by using signaling on a CAPWAP tunnel, tracing of signaling, terminated at an AP, of a user equipment using an Extensible Authentication Protocol (Extensible Authentication Protocol, EAP) authentication manner. As shown in FIG. 4, the method includes the following steps:

401. Preset a signaling tracing task for the user equipment on the AC.

In specific implementation, according to a user instruction, the AC adds an identifier of a user equipment on which signaling tracing needs to be performed into a preset tracing task list, and further, may further preset start time and stop time of signaling tracing performed on the user equipment.

402. When the AP receives an access request of the user equipment, the AP buffers signaling related to the user equipment.

When the AP receives the access request of the user equipment, if the AP is not clear about whether signaling tracing needs to be performed on the user equipment, the AP may first buffer the signaling related to the user equipment.

403. The AP sends an EAP authentication request message to the AC through the CAPWAP tunnel.

The EAP authentication request message includes a user equipment identifier, and in this embodiment, the user equipment identifier is an international mobile subscriber identity (International Mobile Subscriber Identification Number, IMSI) of the user equipment.

404. The AC parses the EAP authentication request message, and determines whether signaling tracing needs to be performed on the user equipment.

In specific implementation, after receiving the EAP authentication request message, the AC parses the included user equipment identifier, if the user equipment identifier is the IMSI of the user equipment, queries the tracing task list, and determines whether signaling tracing needs to be performed on the user equipment.

If the user equipment identifier is not the IMSI of the user equipment, but a pseudo-random network access identifier (Network Access Identifier, NAI), a correspondence between the pseudo-random NAI and the IMSI needs to be first queried by using an interface between the AC and a 3GPP authentication server (Authentication, Authorization, Accounting, AAA) to acquire the IMSI of the user equipment, then the tracing task list is queried, and it is determined whether signaling tracing needs to be performed on the user equipment.

405. The AC returns an EAP authentication request response message to the AP through the CAPWAP tunnel.

In specific implementation, if the AC determines that signaling tracing does not need to be performed on the user equipment, the EAP authentication request response message does not carry a tracing identifier or the tracing identifier is no tracing; and if the AC determines that signaling tracing needs to be performed on the user equipment, the EAP authentication request response message carries the tracing identifier or the tracing identifier is tracing.

It should be noted that, the AC may also use newly-added signaling, for example, Trace Start signaling, to notify the AP that signaling tracing needs to be performed on the user equipment, where the Trace Start signaling includes the user equipment identifier.

406. The AP deletes locally buffered signaling related to the user equipment.

After the AP receives the EAP authentication request response message or the Trace Start signaling, if it is determined that the EAP authentication request response message does not carry the tracing identifier or the tracing identifier is no tracing, the AP deletes the locally buffered signaling related to the user equipment.

It should be noted that, in order to relieve local buffer pressure of the AP, when the AP does not receive the EAP authentication request response message or the Trace Start signaling with in a preset timeout period, the AP may also delete the locally buffered signaling related to the user equipment and stop buffering the signaling related to the user equipment.

407. The AP reports the signaling related to the user equipment to the AC.

In specific implementation, after the AP receives the EAP authentication request response message or the Trace Start signaling, if it is determined that the EAP authentication request response message carries the tracing identifier or the tracing identifier is tracing, the AP may send, by using a newly-added tracing result reporting message in the CAPWAP tunnel, the locally buffered and subsequently generated signaling related to the user equipment to the AC.

408. The AP uploads the signaling related to the user equipment to an FTP server.

In an optional implementation manner of the present invention, after the AP receives the EAP authentication request response message or the Trace Start signaling, if it is determined that the EAP authentication request response message carries the tracing identifier or the tracing identifier is tracing, the AP saves the locally buffered and subsequently generated signaling related to the user equipment as a format file, for example, a PCAP format, and uploads the format file to a specified server, for example, an FTP server.

It should be noted that, if the EAP authentication request response message received by the AP does not carry the tracing identifier, but the AP receives, within the preset timeout period, the Trace Start signaling delivered by the AC through the CAPWAP tunnel, the AP may report, by using the newly-added tracing result reporting message in the CAPWAP tunnel, the locally buffered and subsequently generated signaling related to the user equipment to the AC, or save the locally buffered and subsequently generated signaling related to the user equipment as a format file, for example, a PCAP format, and directly upload the format file to a specified FTP server.

In this embodiment of the present invention, an AC receives an EAP authentication request message that includes a user equipment identifier and is sent by an AP, queries a preset tracing task list, and determines whether to perform signaling tracing on the user equipment; and if it is determined that tracing is needed, an EAP authentication request response message that includes a tracing identifier or Trace Start signaling that includes the user equipment identifier is returned to the AP, so that the AP performs a signaling tracing operation on the user equipment. In this way, signaling tracing for a specified user equipment only needs to be initiated on the AC, and then tracing of all signaling related to the user equipment may be implemented, where the signaling includes signaling that is terminated at the AP and exchanged between the access controller and peripheral network elements, which improves efficiency in signaling tracing.

Figure 5:
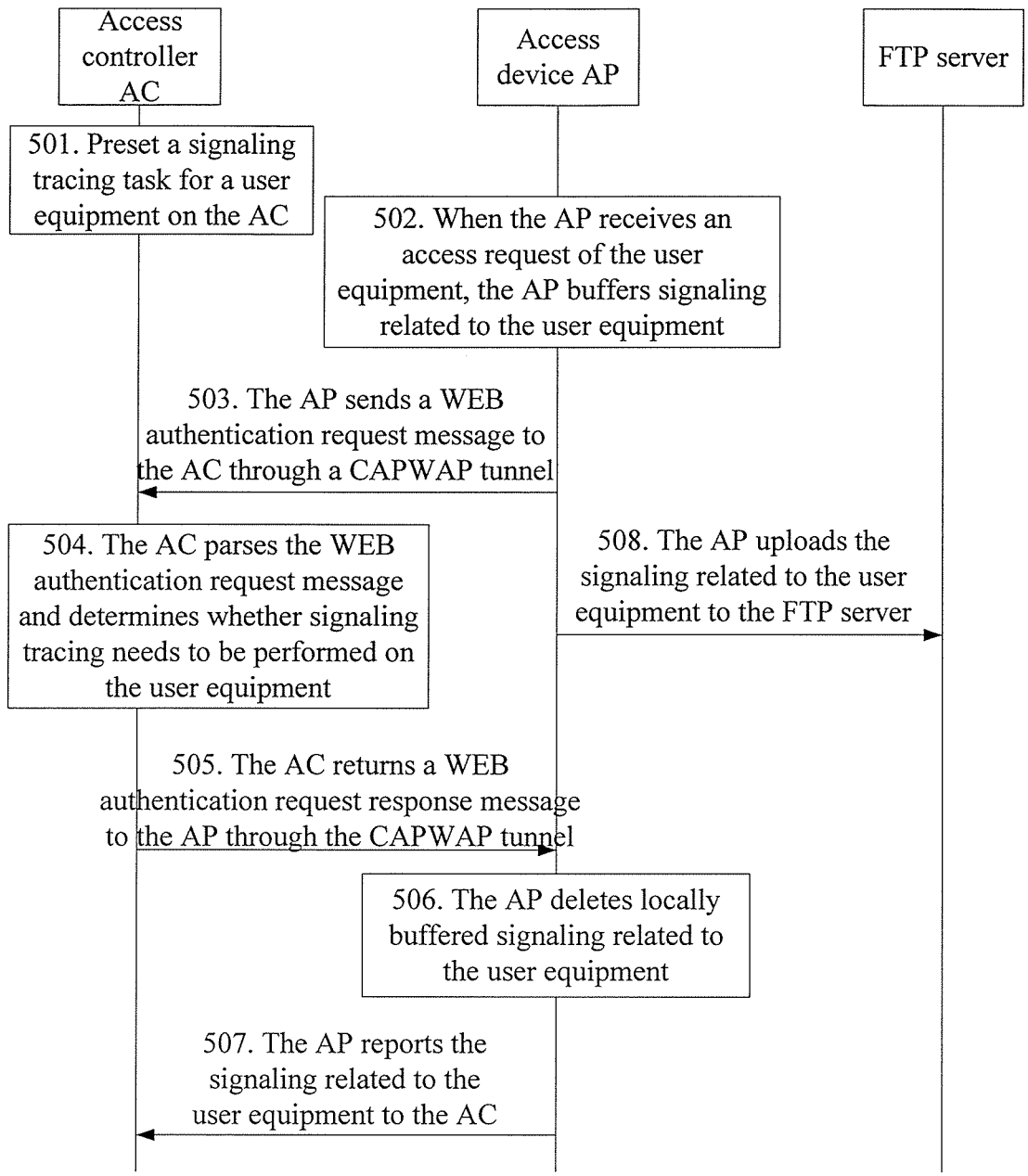
FIG. 5 is a signaling diagram of a user equipment tracing method according to another embodiment of the present invention.

FIG. 5 is a signaling diagram of a user equipment tracing method according to another embodiment of the present invention. In a process in which a user equipment accesses a WLAN network, an AC triggers, by using signaling on a CAPWAP tunnel, tracing of signaling, terminated at an AP, of a user equipment using a network WEB authentication manner. As shown in FIG. 5, the method includes the following steps:

501. Preset a signaling tracing task for the user equipment on the AC.

In specific implementation, according to a user instruction, the AC adds an identifier of a user equipment on which signaling tracing needs to be performed into a preset tracing task list, and further, may further preset start time and stop time of signaling tracing performed on the user equipment.

502. When the AP receives an access request of the user equipment, the AP buffers signaling related to the user equipment.

When the AP receives the access request of the user equipment, if the AP is not clear about whether signaling tracing needs to be performed on the user equipment, the AP may first buffer the signaling related to the user equipment.

503. The AP sends a WEB authentication request message to the AC through the CAPWAP tunnel.

The WEB authentication request includes a user equipment identifier, and in this embodiment, the user equipment identifier is an Internet card number of the user equipment.

504. The AC parses the WEB authentication request message and determines whether signaling tracing needs to be performed on the user equipment.

In specific implementation, after receiving the WEB authentication request message, the AC parses the included user equipment identifier (internet card number), queries the tracing task list, and determines whether signaling tracing needs to be performed on the user equipment.

505. The AC returns a WEB authentication request response message to the AP through the CAPWAP tunnel.

In specific implementation, if the AC determines that signaling tracing does not need to be performed on the user equipment, the WEB authentication request response message does not carry a tracing identifier or the tracing identifier is no tracing; if the AC determines that signaling tracing needs to be performed on the user equipment, the WEB authentication request response message carries the tracing identifier or the tracing identifier is tracing.

It should be noted that, the AC may also use newly-added signaling, for example, Trace Start signaling, to notify the AP that signaling tracing needs to be performed on the user equipment, where the Trace Start signaling includes the user equipment identifier.

506. The AP deletes locally buffered signaling related to the user equipment.

After deleting the locally buffered signaling related to the user equipment, the AP stops buffering the signaling related to the user equipment.

After the AP receives the WEB authentication request response message or the Trace Start signaling, if it is determined that the WEB authentication request response message does not carry the tracing identifier or the tracing identifier is no tracing, the AP deletes the locally buffered signaling related to the user equipment.

It should be noted that, in order to relieve local buffer pressure of the AP, when the AP does not receive the WEB authentication request response message or the Trace Start signaling with in a preset timeout period, the AP may also delete the locally buffered signaling related to the user equipment.

507. The AP reports the signaling related to the user equipment to the AC.

In specific implementation, after the AP receives the WEB authentication request response message or the Trace Start signaling, if it is determined that the WEB authentication request response message carries the tracing identifier or the tracing identifier is tracing, the AP may send, by using a newly-added tracing result reporting message in the CAPWAP tunnel, the locally buffered and subsequently generated signaling related to the user equipment to the AC.

508. The AP uploads the signaling related to the user equipment to an FTP server.

In an optional implementation manner of the present invention, after the AP receives the WEB authentication request response message or the Trace Start signaling, if it is determined that the WEB authentication request response message carries the tracing identifier or the tracing identifier is tracing, the AP saves the locally buffered and subsequently generated signaling related to the user equipment as a format file, for example, a PCAP format, and uploads the format file to a specified server, for example, an FTP server.

It should be noted that, if the WEB authentication request response message received by the AP does not carry the tracing identifier, but the AP receives, within the preset timeout period, the Trace Start signaling delivered by the AC through the CAPWAP tunnel, the AP may report, by using the newly-added tracing result reporting message in the CAPWAP tunnel, the locally buffered and subsequently generated signaling related to the user equipment to the AC, or save the locally buffered and subsequently generated signaling related to the user equipment as a format file, for example, a PCAP format, and directly upload the format file to a specified FTP server.

In this embodiment of the present invention, an AC receives a WEB authentication request message that includes a user equipment identifier and is sent by an AP, queries a preset tracing task list, and determines whether to perform signaling tracing on the user equipment; and if it is determined that tracing is needed, a WEB authentication request response message that includes a tracing identifier or Trace Start signaling that includes the user equipment identifier is returned to the AP, so that the AP performs a signaling tracing operation on the user equipment. In this way, signaling tracing for a specified user equipment only needs to be initiated on the AC, and then tracing of all signaling related to the user equipment may be implemented, where the signaling includes signaling that is terminated at the AP and exchanged between the access controller and peripheral network elements, which improves efficiency in signaling tracing.

Figure 6:
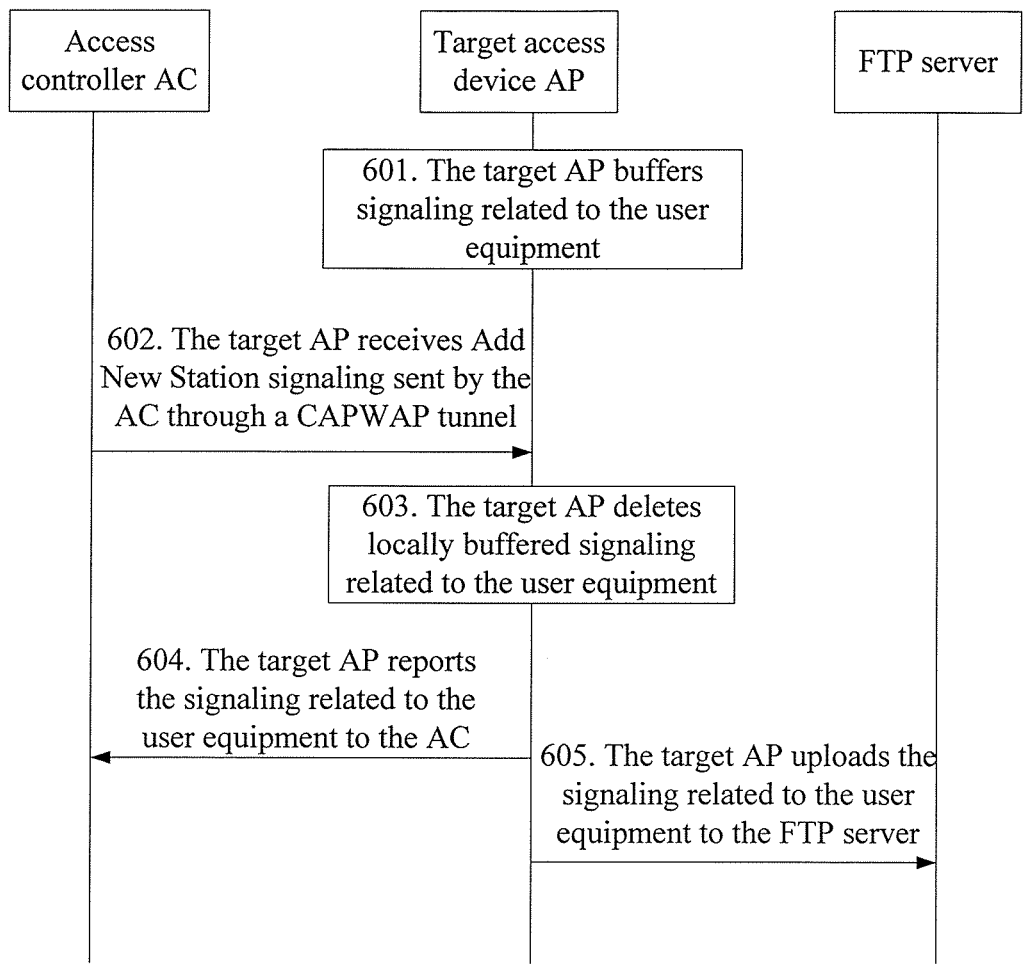
FIG. 6 is a signaling diagram of a user equipment tracing method according to another embodiment of the present invention.

FIG. 6 is a signaling diagram of a user equipment tracing method according to another embodiment of the present invention. When a user equipment that has accessed a WLAN network switches between APs (that is, switches an original AP to a target AP), an AC triggers, by using CAPWAP tunnel signaling, tracing of signaling of the user equipment terminated at the target AP. As shown in FIG. 6, the method includes the following steps:

601. The target AP buffers signaling related to the user equipment.

It should be noted that, in this embodiment, a signaling tracing task may be preset for the user equipment on the AC. In specific implementation, according to a user instruction, the AC adds an identifier of a user equipment on which signaling tracing needs to be performed into a preset tracing task list, and further, may also further preset start time and stop time of signaling tracing performed on the user equipment.

When the user equipment that has accessed the WLAN network switches the original AP to the target AP, if the target AP is not clear about whether signaling tracing needs to be performed on the user equipment, the target AP may first buffer the signaling related to the user equipment.

602. The target AP receives Add New Station signaling sent by the AC through a CAPWAP tunnel.

It should be noted that, in this embodiment, before receiving the Add New Station signaling sent by the AC through the CAPWAP tunnel, the target AP may send, to the AC, at least one of: the WEB authentication request message, or the association request message, or the EAP authentication request message that includes a user equipment identifier according to the foregoing embodiment; the AC may parse the user equipment identifier included in the foregoing message, query the tracing task list, and determine whether signaling tracing needs to be performed on the user equipment, and then, the AC sends newly-added signaling, for example, Add New Station signaling, to the AP through the CAPWAP tunnel.

The Add New Station signaling carries the user equipment identifier and/or a tracing identifier, where the user equipment identifier includes but is not limited to at least one of: a MAC address, an IMSI, an Internet card number, an IMEI, or an MSISDN of the user equipment.

603. The target AP deletes locally buffered signaling related to the user equipment.

After the target AP receives the Add New Station signaling, if it is determined that the Add New Station signaling does not carry the tracing identifier or the tracing identifier is no tracing, the target AP deletes the locally buffered signaling related to the user equipment and stops buffering the signaling related to the user equipment.

604. The target AP reports the signaling related to the user equipment to the AC.

In specific implementation, after the target AP receives the Add New Station signaling, if it is determined that the Add New Station signaling carries the tracing identifier or the tracing identifier is tracing, the target AP may send, by using a newly-added tracing result reporting message in the CAPWAP tunnel, the locally buffered and subsequently generated signaling related to the user equipment to the AC.

605. The target AP uploads the signaling related to the user equipment to an FTP server.

In an optional implementation manner of the present invention, after the target AP receives the Add New Station signaling, if it is determined that the Add New Station signaling carries the tracing identifier or the tracing identifier is tracing, the target AP saves the locally buffered and subsequently generated signaling related to the user equipment as a format file, for example, a PCAP format, and uploads the format file to a specified server, for example, an FTP server.

In this embodiment of the present invention, when a user equipment that has accessed a network switches between APs, a target AP receives Add New Station signaling that includes a user equipment identifier or a tracing identifier and is sent by an AC, and determines whether signaling tracing is to be performed on the user equipment. In this way, signaling tracing for a specified user equipment only needs to be initiated on the AC, and then tracing of all signaling related to the user equipment may be implemented, where the signaling includes signaling that is terminated at the AP and exchanged between the access controller and peripheral network elements. Even if a user equipment frequently switches between APs, there is no need to preset signaling tracing for the user equipment on each AP one by one, which improves efficiency in signaling tracing, and a problem that an existing user equipment tracing method has low efficiency in tracing user signaling terminated at an AP may be alleviated.

Figure 7:
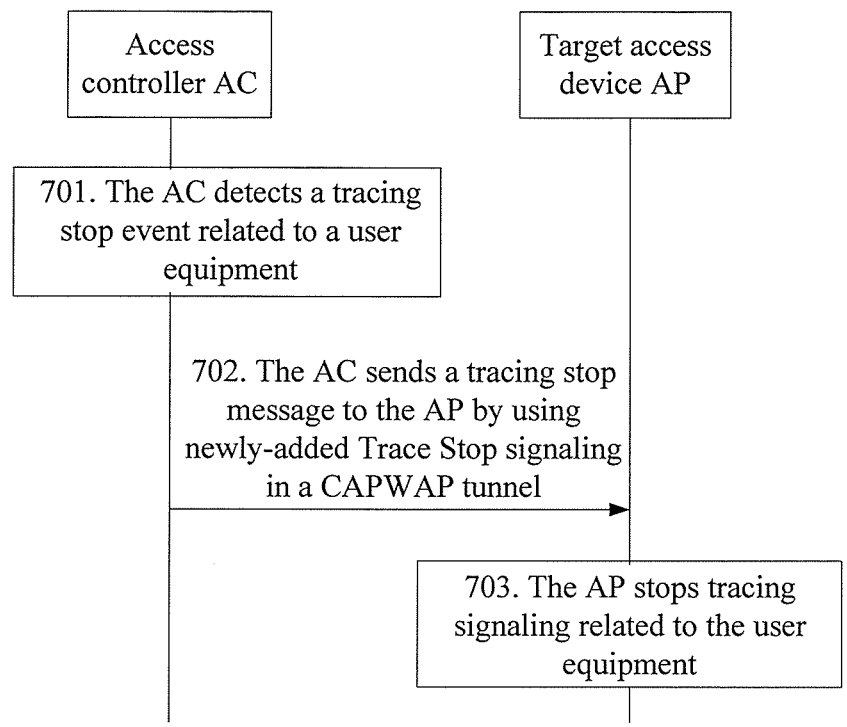
FIG. 7 is a signaling diagram of a user equipment tracing method according to another embodiment of the present invention.

FIG. 7 is a signaling diagram of a user equipment tracing method according to another embodiment of the present invention. As shown in FIG. 7, the method includes the following steps:

701. An AC detects a tracing stop event related to a user equipment.

In specific implementation, the AC presets, in a tracing task list, start time and stop time of signaling tracing performed on the user equipment; for example, it is determined that current system time is preset tracing stop time, and for another example, the IE identifier is deleted from the tracing task list according to a user instruction, that is, tracing of signaling related to the user equipment is stopped.

702. The AC sends a tracing stop message to an AP by using newly-added Trace Stop signaling in a CAPWAP tunnel.

The Trace Stop signaling includes a user equipment identifier.

703. The AP stops tracing signaling related to the user equipment.

In specific implementation, the AP stops sending the signaling related to the user equipment to the AC, or stops sending the signaling related to the user equipment to a specified FTP server.

In this embodiment of the present invention, an AC sends a tracing stop message that includes a user equipment identifier to an AP, so that the AP stops tracing signaling related to the user equipment. A signaling tracing stop instruction for the user equipment only needs to be initiated on the AC, and then tracing of all signaling related to the user equipment may be stopped, where the signaling includes signaling that is terminated at the AP and exchanged between the AC and peripheral network elements, which improves efficiency in terminating signaling tracing.

Figure 8:
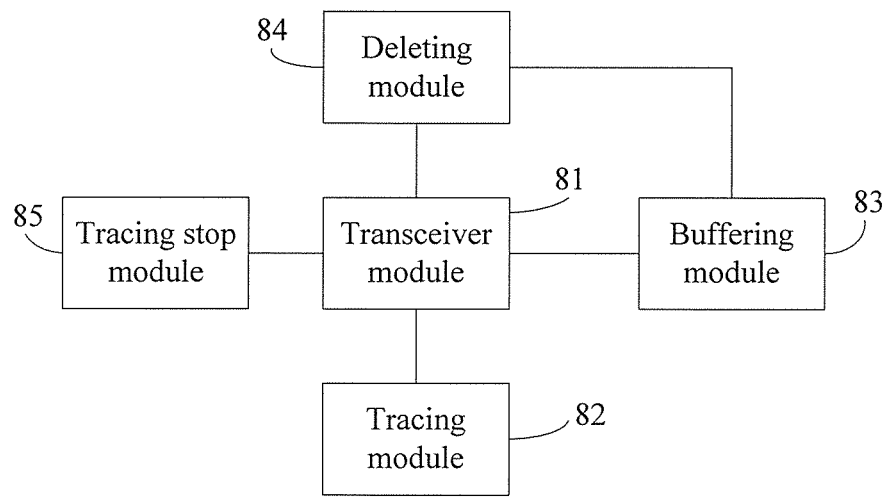
FIG. 8 is a schematic structural diagram of an access device according to another embodiment of the present invention.

FIG. 8 is a schematic structural diagram of an access device according to another embodiment of the present invention. As shown in FIG. 8, the access device includes:

a transceiver module 81, configured to send a query request message to an access controller, where the query request message includes a user equipment identifier, so that the access controller queries a tracing task list according to the user equipment identifier, determines whether the tracing task list includes the user equipment identifier, and sends a query response message to the access device; and a tracing module 82, configured to, on a basis in which the transceiver module receives a query response message sent by the access controller, perform a signaling tracing operation on the user equipment if it is determined that the query response message includes a tracing identifier and/or the user equipment identifier.

In an optional implementation manner of the present invention, the tracing module 82 is specifically configured to send signaling related to the user equipment to the access controller, or send the signaling related to the user equipment to a specified server.

It should be noted that, the user equipment is a user equipment to which the user equipment identifier points.

In an optional implementation manner of the present invention, the access device further includes:

a buffering module 83, configured to, on a basis in which the transceiver module receives an access request sent by the user equipment, buffer signaling related to the user equipment; and a deleting module 84, configured to, on the basis in which the transceiver module receives a query response message sent by the access controller, delete the signaling related to the user equipment buffered in the buffering module 83 and stop buffering the signaling related to the user equipment, if it is determined that the query response message does not include the tracing identifier.

In an optional implementation manner of the present invention, the buffering module 83 is specifically configured to, on a basis in which the transceiver module does not receive, within a preset timeout period, the query response message sent by the access controller, delete buffered signaling related to the user equipment and stop buffering signaling of the user equipment.

It should be noted that, the query request message includes but is not limited to at least one of: an association request message, or an authentication request message, or a handover request message;

the user equipment identifier includes but is not limited to at least one of: a media access control MAC address, or an international mobile subscriber identity IMSI, or an Internet card number, or an international mobile equipment identity IMEI, or an international mobile equipment identity MSISDN of the user equipment; and the query response message includes but is not limited to at least one of: an association answer message, or an authentication answer message, or a tracing starting message, or a handover notification message.

In an optional implementation manner of the present invention, the access device further includes:

a tracing stop module 85, configured to, on a basis in which the transceiver module receives a tracing stop message sent by the access controller, where the tracing stop message includes the user equipment identifier, stop performing the signaling tracing operation on the user equipment; and specifically configured to send signaling related to the user equipment to the access controller, or stop sending the signaling related to the user equipment to a specified server.

In this embodiment of the present invention, an access device sends a query request message that includes a user equipment identifier to an access controller, so that the access controller queries a tracing task list, and determines whether to perform signaling tracing on the user equipment; and if it is determined that tracing is needed, a query response message that includes a tracing identifier is returned to the access device, and the access device performs a signaling tracing operation on the user equipment according to the tracing identifier or the user equipment identifier. In this way, signaling tracing for a specified user equipment only needs to be initiated on the access controller, and then tracing of all signaling related to the user equipment may be implemented, where the signaling includes signaling that is terminated at the access device and exchanged between the access controller and peripheral network elements. Even if a user equipment frequently switches between APs, there is no need to preset signaling tracing for the user equipment on each AP one by one, which improves efficiency in signaling tracing. Therefore, a problem that an existing user equipment tracing method has low efficiency in tracing user signaling terminated at an AP may be alleviated.

Figure 9:
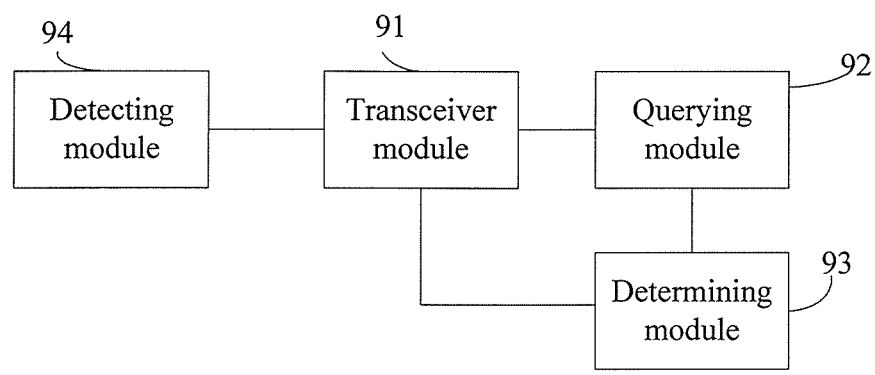
FIG. 9 is a schematic structural diagram of an access controller according to another embodiment of the present invention.

FIG. 9 is a schematic structural diagram of an access controller according to another embodiment of the present invention. As shown in FIG. 9, the access controller includes:

a transceiver module 91, configured to receive a query request message sent by an access device, where the query request message includes a user equipment identifier;

a querying module 92, configured to, on a basis of the query request message received by the transceiver module, query a tracing task list according to the user equipment identifier; and a determining module 93, configured to, on a basis in which the querying module queries a tracing task list, determine that the tracing task list includes the user equipment identifier, and send a query response message to the access device by using the transceiver module, where the query response message includes a tracing identifier and/or the user equipment identifier, so that the access device performs a signaling tracing operation on the user equipment according to the tracing identifier and/or the user equipment identifier.

It should be noted that, the user equipment is a user equipment to which the user equipment identifier points.

The query request message includes but is not limited to at least one of: an association request message, or an authentication request message, or a handover request message;

the user equipment identifier includes but is not limited to at least one of: a media access control MAC address, or an international mobile subscriber identity IMSI, or an Internet card number, or an international mobile equipment identity IMEI, or an international mobile equipment identity MSISDN of the user equipment; and the query response message includes but is not limited to at least one of: an association answer message, or an authentication answer message, or a tracing starting message, or a handover notification message.

In an optional implementation manner of the present invention, the access controller further includes:

a detecting module 94, configured to detect a tracing stop event related to the user equipment.

In an optional implementation manner of the present invention, the transceiver module 91 is configured to, on a basis in which the detecting module detects a tracing stop event related to the user equipment, send a tracing stop message to the access device, where the tracing stop message includes the user equipment identifier, so that the access device stops sending signaling related to the user equipment to the access controller, or stops sending the signaling related to the user equipment to a specified server.

In this embodiment of the present invention, an access controller receives a query request message that includes a user equipment identifier and is sent by an access device, queries a tracing task list, and determines whether to perform signaling tracing on the user equipment; and if it is determined that tracing is needed, a query response message that includes a tracing identifier is returned to the access device, so that the access device performs a signaling tracing operation on the user equipment according to the tracing identifier. In this way, signaling tracing for a specified user equipment only needs to be initiated on the access controller, and then tracing of all signaling related to the user equipment may be implemented, where the signaling includes signaling that is terminated at the access device and exchanged between the access controller and peripheral network elements. Even if a user equipment frequently switches between APs, there is no need to preset signaling tracing for the user equipment on each AP one by one, which improves efficiency in signaling tracing. Therefore, a problem that an existing user equipment tracing method has low efficiency in tracing user signaling terminated at an AP may be alleviated.

Another embodiment of the present invention provides a user equipment tracing system, including the access device provided in the embodiment corresponding to FIG. 7 and the access controller provided in the embodiment corresponding to FIG. 8. For detailed description of the access device, reference may be made to relevant content in the embodiment corresponding to FIG. 7; for detailed description of the access controller, reference may be made to relevant content in the embodiment corresponding to FIG. 8; and details are not described herein again.

Another embodiment of the present invention provides an access device, including a processor; and when the processor runs, the following steps may be performed:

sending a query request message to an access controller, where the query request message includes a user equipment identifier, so that the access controller queries a tracing task list according to the user equipment identifier, determines whether the tracing task list includes the user equipment identifier, and sends a query response message to the access device; and receiving the query response message sent by the access controller, and if it is determined that the query response message includes a tracing identifier and/or the user equipment identifier, performing a signaling tracing operation on the user equipment; where the user equipment is a user equipment to which the user equipment identifier points.

In a first possible implementation manner, before the sending a query request message to an access controller, the following is included:

receiving an access request sent by the user equipment, and buffering signaling related to the user equipment; and after the receiving the query response message sent by the access controller, the following is included:

if it is determined that the query response message does not include the tracing identifier, deleting the buffered signaling related to the user equipment and stopping buffering signaling of the user equipment.

In a second possible implementation manner, the receiving the query response message sent by the access controller includes:

if the query response message sent by the access controller is not received within a preset timeout period, deleting the buffered signaling related to the user equipment and stopping buffering signaling of the user equipment.

The query request message includes but is not limited to at least one of: an association request message, or an authentication request message, or a handover request message;

the user equipment identifier includes but is not limited to at least one of: a MAC address, or an IMSI, or an Internet card number, or an IMEI, or an MSISDN of the user equipment; and the query response message includes but is not limited to at least one of: an association answer message, or an authentication answer message, or a tracing starting message (for example, Trace Start), or a handover notification message (for example, Add new station).

In a third possible implementation manner, the performing a signaling tracing operation on the user equipment includes:

sending signaling related to the user equipment to the access controller, or sending the signaling related to the user equipment to a specified server.

Based on the first, the second, and the third possible implementation manners, in a fourth possible implementation manner, the processor further performs the following steps:

receiving a tracing stop message sent by the access controller, where the tracing stop message includes the user equipment identifier; and stopping performing the signaling tracing operation on the user equipment includes: sending the signaling related to the user equipment to the access controller, or stopping sending the signaling related to the user equipment to a specified server.

Another embodiment of the present invention provides an access controller, including a processor; and when the processor runs, the following steps may be performed:

receiving a query request message sent by an access device, where the query request message includes a user equipment identifier;

querying a tracing task list according to the user equipment identifier; and determining that the tracing task list includes the user equipment identifier, and sending a query response message to the access device, where the query response message includes a tracing identifier and/or the user equipment identifier, so that the access device performs a signaling tracing operation on the user equipment according to the tracing identifier and/or the user equipment identifier; where the user equipment is a user equipment to which the user equipment identifier points.

The query request message includes but is not limited to at least one of: an association request message, or an authentication request message, or a handover request message;

the user equipment identifier includes but is not limited to at least one of: a MAC address, or an IMSI, or an Internet card number, or an IMEI, or an MSISDN of the user equipment; and the query response message includes but is not limited to at least one of: an association answer message, or an authentication answer message, or a tracing starting message (for example, Trace Start), or a handover notification message (for example, Add new station).

In a first possible implementation manner, the processor further performs the following steps:

detecting a tracing stop event related to the user equipment; and sending a tracing stop message to the access device, where the tracing stop message includes the user equipment identifier, so that the access device stops sending signaling related to the user equipment to the access controller, or stops sending the signaling related to the user equipment to a specified server.

In this embodiment of the present invention, an access controller receives a query request message that includes a user equipment identifier and is sent by an access device, queries a tracing task list, and determines whether to perform signaling tracing on the user equipment; and if it is determined that tracing is needed, a query response message that includes a tracing identifier is returned to the access device, so that the access device performs a signaling tracing operation on the user equipment according to the tracing identifier. In this way, even if a user equipment frequently switches between APs, it may be implemented that signaling tracing does not need to be preset for the user equipment on each AP one by one, which may alleviate a problem that an existing user equipment tracing method has low efficiency in tracing user signaling terminated at an AP.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. A user equipment tracing method, comprising:
sending, by an access device, a query request message to an access controller, wherein the query request message comprises a user equipment identifier, so that the access controller queries a tracing task list according to the user equipment identifier, determines whether the tracing task list comprises the user equipment identifier, and sends a query response message to the access device, wherein the tracing task list includes a plurality of user equipment identifiers, a tracing start time corresponding to each of the plurality of user equipment identifiers, and a tracing stop time corresponding to each of the plurality of user equipment identifiers; and
receiving, by the access device, the query response message sent by the access controller, and if it is determined that the query response message comprises a tracing identifier and/or the user equipment identifier, performing a signaling tracing operation on a user equipment corresponding to the user equipment identifier.

2. The method according to claim 1, wherein:
before sending, by the access device, the query request message to the access controller, the method comprises:
receiving, by the access device, an access request sent by the user equipment, and buffering signaling related to the user equipment; and
after receiving, by the access device, the query response message sent by the access controller, the method comprises:
if it is determined that the query response message does not comprise the tracing identifier, deleting the buffered signaling related to the user equipment and stopping buffering signaling of the user equipment.

3. The method according to claim 1, wherein receiving, by the access device, the query response message sent by the access controller comprises:
if the access device does not receive, within a preset timeout period, the query response message sent by the access controller, deleting buffered signaling related to the user equipment and stopping buffering signaling of the user equipment.

4. The method according to claim 1, wherein:
the query request message comprises at least one of: an association request message, or an authentication request message, or a handover request message;
the user equipment identifier comprises at least one of: a media access control MAC address, or an international mobile subscriber identity IMSI, or an Internet card number, or an international mobile equipment identity IMEI, or a mobile station international ISDN number (MSISDN) of the user equipment; and
the query response message comprises at least one of:
an association answer message, when the query request message comprises the association request message, or
an authentication answer message, when the query request message comprises the authentication request message, or
a tracing starting message, or
a handover notification message, when the query request message comprises the handover request message.

5. The method according to claim 1, wherein performing a signaling tracing operation on the user equipment comprises:
sending, by the access device, signaling related to the user equipment to the access controller, or sending the signaling related to the user equipment to a specified server.

6. The method according to claim 1, further comprising:
receiving, by the access device, a tracing stop message sent by the access controller, wherein the tracing stop message comprises the user equipment identifier; so that the access device stops performing the signaling tracing operation on the user equipment wherein further comprises: stopping sending the signaling related to the user equipment to the access controller, or stopping sending the signaling related to the user equipment to a specified server.

7. An access device, comprising:
a processor configured to:
send a query request message to an access controller, wherein the query request message comprises a user equipment identifier, so that the access controller queries a tracing task list according to the user equipment identifier, determines whether the tracing task list comprises the user equipment identifier, and sends a query response message to the access device, wherein the tracing task list includes a plurality of user equipment identifiers, a tracing start time corresponding to each of the plurality of user equipment identifiers, and a tracing stop time corresponding to each of the plurality of user equipment identifiers; and if it is determined that the query response message comprises a tracing identifier and/or the user equipment identifier, performing a signaling tracing operation on the user equipment.

8. The access device according to claim 7, wherein the processor is further configured to:
buffer signaling related to the user equipment on a basis in which an access request sent by the user equipment is received; and
on a basis in which a query response message sent by the access controller is received, delete the buffered signaling related to the user equipment and stop buffering signaling of the user equipment, if it is determined that the query response message does not comprise the tracing identifier.

9. The access device according to claim 7, wherein the processor is further configured to, on a basis in which the query response message sent by the access controller is not received within a preset timeout period, delete buffered signaling related to the user equipment and stop buffering signaling of the user equipment.

10. The access device according to claim 7, wherein:
the query request message comprises at least one of: an association request message, or an authentication request message, or a handover request message;
the user equipment identifier comprises at least one of: a media access control MAC address, or an international mobile subscriber identity IMSI, or an Internet card number, or an international mobile equipment identity IMEI, or an international mobile equipment identity MSISDN of the user equipment; and
the query response message comprises at least one of:
an association answer message, when the query request message comprises the association request message, or
an authentication answer message, when the query request message comprises the authentication request message, or
a tracing starting message, or
a handover notification message, when the query request message comprises the handover request message.

11. The access device according to claim 7, wherein the processor is further configured to send signaling related to the user equipment to the access controller, or send the signaling related to the user equipment to a specified server.

12. The access device according to claim 7, wherein the processor is further configured to:
on a basis in which a tracing stop message sent by the access controller is received, wherein the tracing stop message comprises the user equipment identifier, stop perfoiiiiing the signaling tracing operation on the user equipment; and
send the signaling related to the user equipment to the access controller, or stop sending the signaling related to the user equipment to a specified server.

13. An access controller, comprising:
a processor configured to:
receive a query request message sent by an access device, wherein the query request message comprises a user equipment identifier;
query a tracing task list according to the user equipment identifier, wherein the tracing task list includes a plurality of user equipment identifiers, a tracing start time corresponding to each of the plurality of user equipment identifiers, and a tracing stop time corresponding to each of the plurality of user equipment identifiers; and
determine that the tracing task list comprises the user equipment identifier, and send a query response message to the access device by using a transceiver module, wherein the query response message comprises a tracing identifier and/or the user equipment identifier, so that the access device performs a signaling tracing operation on the user equipment according to the tracing identifier and/or the user equipment identifier, wherein the user equipment is a user equipment to which the user equipment identifier points.

14. The access controller according to claim 13, wherein:
the query request message comprises at least one of: an association request message, or an authentication request message, or a handover request message;
the user equipment identifier comprises at least one of: a media access control MAC address, or an international mobile subscriber identity IMSI, or an Internet card number, or an international mobile equipment identity IMEI, or an international mobile equipment identity MSISDN of the user equipment; and
the query response message comprises at least one of:
an association answer message, when the query request message comprises the association request message, or
an authentication answer message, when the query request message comprises the authentication request message, or
a tracing starting message, or
a handover notification message, when the query request message comprises the handover request message.

15. The access controller according to claim 13, wherein the processor is further configured to:
detect a tracing stop event related to the user equipment; and
send a tracing stop message to the access device, wherein the tracing stop message comprises the user equipment identifier, so that the access device stops sending signaling related to the user equipment to the access controller, or stops sending the signaling related to the user equipment to a specified server.

* * * * *